(12) United States Patent
Ozawa et al.

(10) Patent No.: US 10,184,015 B2
(45) Date of Patent: Jan. 22, 2019

(54) PROCESS FOR PRODUCING (METH)ACRYLIC RESIN COMPOSITION

(71) Applicant: KURARAY Co., Ltd., Kurashiki-shi (JP)

(72) Inventors: Hiroshi Ozawa, Tainai (JP); Yasuhito Kitade, Tainai (JP); Shouji Tanaka, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 0 days.

(21) Appl. No.: 15/553,714

(22) PCT Filed: Feb. 26, 2016

(86) PCT No.: PCT/JP2016/055757
§ 371 (c)(1),
(2) Date: Aug. 25, 2017

(87) PCT Pub. No.: WO2016/136930
PCT Pub. Date: Sep. 1, 2016

(65) Prior Publication Data
US 2018/0030164 A1    Feb. 1, 2018

(30) Foreign Application Priority Data

Feb. 27, 2015   (JP) ................. 2015-039648

(51) Int. Cl.
*C08F 6/28* (2006.01)
*C08F 20/14* (2006.01)
(Continued)

(52) U.S. Cl.
CPC .................. *C08F 6/28* (2013.01); *C08F 2/02* (2013.01); *C08F 6/10* (2013.01); *C08F 20/14* (2013.01);
(Continued)

(58) Field of Classification Search
CPC .... C08F 6/28; C08F 20/14; C08F 2/02; C08F 6/10; C08F 220/14
See application file for complete search history.

(56) References Cited

U.S. PATENT DOCUMENTS 3,968,059 A   7/1976  Shimada et al.
5,898,055 A   4/1999  Moriya et al.
(Continued)

FOREIGN PATENT DOCUMENTS

GB   2 274 845      8/1994
JP   50-109278      8/1975
(Continued)

OTHER PUBLICATIONS

International Search Report dated May 17, 2016, in PCT/JP2016/055757, filed Feb. 26, 2016.
(Continued)

*Primary Examiner* — John E Uselding
(74) *Attorney, Agent, or Firm* — Oblon, McClelland, Maier & Neustadt, L.L.P.

(57) ABSTRACT

A method for producing a (meth)acrylic resin composition, comprising: continuously feeding reaction starting materials to a tank reactor, the reaction starting materials comprising a polymerizable monomer component, a chain transfer agent and a radical polymerization initiator, the polymerizable monomer component comprising 50 to 100% by mass of methyl methacrylate, 0 to 20% by mass of an acrylic acid alkyl ester and 0 to 30% by mass of an additional monomer; conducting bulk polymerization of the polymerizable monomer component at a polymerization conversion ratio of 40 to 70% by mass to obtain a liquid containing a (meth)acrylic resin; continuously feeding the resulting liquid to a vented extruder to separate volatile component from the (meth) acrylic resin; conducting distillation using an atmospheric distillation column to separate the volatile component into a (Continued)

high boiling fraction ($C_1$) and a low boiling fraction ($A_1$); and conducting distillation using a vacuum distillation column having a pressure of −50 kPaG to −101 kPaG at the top of the vacuum distillation column to separate the high boiling fraction ($C_1$) into a high boiling fraction ($C_2$) and a low boiling fraction ($A_2$); reusing the low boiling fraction ($A_1$) and the low boiling fraction ($A_2$) as part of the reaction starting materials.

10 Claims, 3 Drawing Sheets

(51) Int. Cl.
    *C08F 2/02* (2006.01)
    *C08F 6/10* (2006.01)
    *C08F 220/14* (2006.01)
(52) U.S. Cl.
    CPC ........ *C08F 220/14* (2013.01); *C08F 2400/00* (2013.01)

(56) References Cited

U.S. PATENT DOCUMENTS 10,017,587 B2 * 7/2018 Ozawa .................. C08F 20/18
2010/0087605 A1    4/2010 Yamamoto et al.

FOREIGN PATENT DOCUMENTS

| JP | 6-228203 A | 8/1994 |
| JP | 10-87705 A | 4/1998 |
| JP | 10-87736 A | 4/1998 |
| JP | 10-182727 A | 7/1998 |
| JP | 2005-82687 A | 3/2005 |
| JP | 2008-101203 A | 5/2008 |

OTHER PUBLICATIONS

Office Action dated Oct. 10, 2018, in European Patent Application No. 16755674.5.

* cited by examiner

PROCESS FOR PRODUCING (METH)ACRYLIC RESIN COMPOSITION

TECHNICAL FIELD

The present invention relates to a method for producing a (meth)acrylic resin composition. More specifically, the present invention relates to a method for producing a (meth) acrylic resin composition, wherein, from a liquid containing a (meth)acrylic resin obtained by a continuous bulk polymerization of a polymerizable monomer component containing methyl methacrylate, an unreacted polymerizable monomer component and an unreached chain transfer agent are recovered at a high efficiency and are reused as part of reaction starting materials.

BACKGROUND ART

There have been developed various methods for producing (meth)acrylic resin composition for optical component. For example, Patent Document 1 discloses a method comprising continuously feeding a recycled liquid containing monomer component mainly comprising unreacted methyl methacrylate recovered after polymerization as well as a monomer component mainly comprising fresh methyl methacrylate to a distillation column, continuously feeding the resulting distilled monomer components into a polymerization reaction tank for bulk polymerization, subsequently devolatizing the resulting liquid containing a polymerization product to recover the polymerization product and simultaneously recovering an unreacted monomer for use as a recycled liquid, and feeding a solvent having a boiling point higher than boiling points of the monomers to a bottom of the distillation column and simultaneously discharging a bottom liquid from the bottom in the same amount as that of the solvent being fed.

Patent Document 2 discloses a method comprising continuously feeding a monomer component mainly comprising methyl methacrylate to a polymerization reaction tank for bulk polymerization, subsequently devolatizing the resulting liquid containing a polymerization product to recover the polymerization product and simultaneously conducting distillation to recover an unreacted monomer for recycling, and removing an acidic substance present in the system by using a basic anion exchange resin.

Patent Document 3 discloses a method comprising continuously feeding a monomer component mainly comprising methyl methacrylate to a polymerization reaction tank for bulk polymerization, subsequently conducting devolatizing treatment of the resulting liquid containing a polymerization product to separate an unreacted monomer, introducing the separated an unreacted monomer to a distillation column, and conducting distillation under reduced pressure so that the content of methyl methacrylate dimer reaches 0.1 to 1.0% by mass whereby the monomer is recovered.

The reaction product solution obtained after bulk polymerization contains an unreacted polymerizable monomer component as well as a relatively great amount of an unreached chain transfer agent. The unreacted polymerizable monomer component can be recovered and reused to some extent in the methods described in Patent Documents 1 to 3, whereas the rate of recovery of the unreacted chain transfer agent is low and therefore most of the unreacted chain transfer agent is discarded. Patent Document 4 or 5 suggests a method for recovering a chain transfer agent, but this method requires use of equipment for treating hydrazines that are added to the system.

CITATION LIST

Patent Literatures

Patent Document 1: JP H10-087736 A
Patent Document 2: JP H10-087705 A
Patent Document 3: JP 2005-082687 A
Patent Document 4: JP H10-132727 A
Patent Document 5: JP H06-228203 A

SUMMARY OF THE INVENTION

Problems to be Solved by the Invention

An object of the present invention is to provide a method for producing a (meth)acrylic resin composition, wherein, from a liquid containing a (meth)acrylic resin obtained by a continuous bulk polymerization of a polymerizable monomer component containing methyl methacrylate, an unreacted polymerizable monomer component and an unreacted chain transfer agent are recovered at a high efficiency, and are reused as part of reaction starting materials.

Means for Solving the Problems

Studies have been conducted to achieve the object. As a result, the present invention has now been completed encompassing the following aspects.
[1] A production method of a (meth)acrylic resin composition, comprising;
continuously feeding reaction starting materials to a tank reactor, the reaction starting materials comprising a polymerizable monomer component, a chain transfer agent, and a radical polymerization initiator, the polymerizable monomer component comprising 50 to 100% by mass of methyl methacrylate, 0 to 20% by mass of an acrylic acid alkyl ester, and 0 to 30% by mass of an additional monomer;
conducting bulk polymerization of the polymerizable monomer component at a polymerization conversion ratio of 40 to 70% by mass to obtain a liquid containing a (meth)acrylic resin;
continuously feeding the resulting liquid to a vented extruder to separate volatile component from the (meth) acrylic resin;
conducting distillation using an atmospheric distillation column to separate the resulting volatile component into a high boiling fraction ($C_1$) and a low boiling fraction ($A_1$);
conducting distillation using a vacuum distillation column having a pressure of −50 kPaG to −101 kPaG at the top of the vacuum distillation to separate the high boiling fraction ($C_1$) into a high boiling fraction ($C_2$) and a low boiling fraction ($A_2$); and
reusing the low boiling fraction ($A_1$) and the low boiling fraction ($A_2$) as part of the reaction starting materials.
[2] The production method according to [1], wherein a mixture of the low boiling fraction ($A_1$) and the low boiling fraction ($A_2$) contains a dimer derived from the polymerizable monomer component in an amount of less than 0.1% by mass.
[3] The production method according to [1] or [2], wherein a pressure at the top of the atmospheric distillation column is −1 kPaG to 1 kPaG and a temperature at the top of the atmospheric distillation column is 90 to 100° C.

[4] The production method according to any one of [1] to [3], wherein the pressure at the top of the vacuum distillation column is −90 kPaG to −101 kPaG and a temperature at the top of the vacuum distillation column is 40 to 70° C.
[5] The production method according to any one of [1] to [4] wherein a column diameter of the vacuum distillation column is smaller than a column diameter of the atmospheric distillation column.
[6] The production method according to any one of [1] to [5], wherein the amount of the chain transfer agent contained in the mixture of the low boiling fraction ($A_1$) and the low boiling fraction ($A_2$) is not less than 50% by mass relative to the amount of the chain transfer agent contained in the volatile component separated with the use of the vented extruder.
[7] The production method according to any one of [1] to [6], wherein the acrylic acid alkyl ester is methyl acrylate or ethyl acrylate.
[8] The production method according to any one of [1] to [7], wherein the chain transfer agent is an alkylmercaptan having 12 or less carbon atoms.
[9] The production method according to any one of [1] to [7], wherein the chain transfer agent is n-octyl mercaptan.
[10] The production method according to any one of [1] to [9], wherein the polymerizable monomer component comprises 80 to 100% by mass of methyl methacrylate and 0 to 20% by mass of the acrylic acid alkyl ester.

Advantageous Effects of the Invention

According to the production method in the present invention, an unreacted polymerizable monomer component as well as an unreacted chain transfer agent can be recovered at a high efficiency. The polymerizable monomer component and the chain transfer agent thus recovered can be reused as part of reaction starting materials to obtain a (meth)acrylic resin composition, without causing discoloration or the like and consequently impairing transparency.

EMBODIMENTS FOR CARRYING OUT THE INVENTION

A method for producing a (meth)acrylic resin composition according to an embodiment of the present invention comprises continuously feeding a polymerizable monomer component, a chain transfer agent and a radical polymerization initiator to a tank reactor, the polymerizable monomer component comprising methyl methacrylate and optionally an acrylic acid alkyl ester and an additional monomer, subjecting the polymerizable monomer component to bulk polymerization to obtain a liquid containing a (meth)acrylic resin made from part of the polymerizable monomer component, continuously feeding the resulting liquid to a vented extruder to separate volatile component from the (meth) acrylic resin, conducting distillation using an atmospheric distillation column to separate the separated volatile component, into a high boiling fraction ($C_1$) and a low boiling fraction ($A_1$), conducting distillation using a vacuum distillation column to separate the high boiling fraction ($C_1$) into a high boiling fraction ($C_2$) and a low boiling fraction ($A_2$), and reusing the low boiling fraction ($A_1$) and the low boiling fraction ($A_2$) as part of the reaction starting materials.

The polymerizable monomer component used in the present invention comprises methyl methacrylate as an essential component. The amount of methyl methacrylate is usually 50 to 100% by mass, preferably 80 to 100% by mass, more preferably 80 to 99.9% by mass, further preferably 80 to 96% by mass, relative to 100% by mass of the polymerizable monomer component.

Methyl methacrylate used in the polymerizable monomer component is from a virgin methyl methacrylate (1) not yet undergone polymerization reaction, a methyl methacrylate (1') contained in the low boiling fraction ($A_1$) and the low boiling fraction ($A_2$) (hereinafter, these two fractions are collectively called fraction (A) sometimes), and a methyl methacrylate (1") optionally used as a solvent for a polymerization initiator (4). Therefore, the feed amount of methyl methacrylate to the tank reactor is equal to the sum of the feed amounts of the methyl methacrylate (1), the methyl methacrylate (1') and the methyl methacrylate (1"). The feed amount of the methyl methacrylate (1) is determined based on information including the feed amount of the fraction (A), the content ratio of the methyl methacrylate (1') in the fraction (A), the feed amount of a solution of the polymerization initiator (4) in methyl methacrylate, and the content ratio of the methyl methacrylate (1") in the solution of the polymerization initiator (4) in methyl methacrylate.

The polymerizable monomer component used in the present invention comprises the acrylic acid alkyl ester as an optional component. The amount of the acrylic acid alkyl ester is usually 0 to 20% by mass, preferably 0.1 to 20% by mass, further preferably 4 to 20% by mass, relative to 100% by mass of the polymerizable monomer component.

The acrylic acid alkyl ester used in the polymerizable monomer component is from a virgin acrylic acid alkyl ester (2) not yet undergone polymerization reaction and an acrylic acid alkyl ester (2') contained in the fraction (A). Therefore, the feed amount of the acrylic acid alkyl ester to the tank reactor is equal to the sum of feed amounts of the acrylic acid alkyl ester (2) and the acrylic acid alkyl ester (2'). The feed amount of the acrylic acid alkyl ester (2) is determined based on information including the feed amount of the fraction (A) and the content ratio of the acrylic acid alkyl ester (2') in the fraction (A).

Examples of the acrylic acid alkyl ester (2) or (2') can include methyl acrylate, ethyl acrylate, propyl acrylate, butyl acrylate, 2-ethylhexyl acrylate, and the like. Among these, methyl acrylate or ethyl acrylate is preferable.

The polymerizable monomer component used in the present invention comprises, as an optional component, an additional monomer except for methyl methacrylate or the acrylic acid alkyl ester. The amount of the additional monomer is usually 0 to 30% by mass, preferably 0 to 15% by mass, further preferably 0 to 5% by mass, relative to 100% by mass of the polymerizable monomer component.

The additional monomer used in the polymerizable monomer component is from a virgin additional monomer (5) not yet undergone polymerization reaction and an additional monomer (5') contained in the fraction (A). Therefore, the feed amount of the additional monomer to the tank reactor is equal to the sum of the feed amounts of the additional monomer (5) and the additional monomer (5'). The feed amount of the additional monomer (5) is determined based on information including the feed amount of the fraction (A) and the content ratio of the additional monomer (5') in the fraction (A).

Examples of the additional monomer (5) or (5') can include vinyl monomers having a single polymerizable alkenyl group per molecule, for example, methacrylic acid alkyl esters except for methyl methacrylate, such as ethyl methacrylate, butyl methacrylate and the like; methacrylic acid aryl esters such as phenyl methacrylate and the like; methacrylic acid cycloalkyl esters such as cyclohexyl methacrylate, norbornenyl methacrylate and the like; acrylic acid aryl esters such as phenyl acrylate and the like; acrylic acid cycloalkyl esters such as cyclohexyl acrylate, norbornenyl acrylate and the like; aromatic vinyl monomers such as styrene, α-methylstyrene and the like; acrylamide; methacrylamide; acrylonitrile; methacrylonitrile; and the like. It is preferable that the boiling point of the additional monomer is not higher than the boiling point of methyl methacrylate or higher than the boiling point of the chain transfer agent to be used.

Each of the methyl methacrylate, the acrylic acid alkyl ester, and the additional monomer has a b* value of preferably −1 to 2, more preferably −0.5 to 1.5. The b* value within this range is advantageous because the resulting (meth)acrylic resin composition, efficiently gives a formed article having little discoloration. The b* value is a value measured in accordance with the standard defined by the International Commission on Illumination (CIE) (1976) or JIS Z-8722.

The chain transfer agent used in the present invention is from a virgin chair transfer agent (3) not yet undergone polymerization reaction and a chain transfer agent (3') contained in the fraction (A). Therefore, the feed amount of the chain transfer agent to the tank reactor is equal to the sum of the feed amounts of the chain transfer agent (3) and the chain transfer agent (3'). The feed amount of the chain transfer agent (3) is determined based on information including the feed amount of the fraction (A) and the content ratio of the chain transfer agent (3') in the fraction (A).

The feed amount of the chain transfer agent is determined so that the (meth)acrylic resin produced by polymerization reaction can have a desirable molecular weight and a desirable molecular weight distribution. More specifically, the amount of the chain transfer agent being fed is preferably 0.1 to 1 part by mass, more preferably 0.2 to 0.8 part by mass, further preferably 0.3 to 0.6 part by mass, relative to 100 parts by mass of the amount of the polymerizable monomer component being fed.

Examples of the chain transfer agent used in the present invention can include alkylmercaptans such as n-octyl mercaptan, n-dodecyl mercaptan, t-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), pentaerythritol tetrakisthiopropionate and the like; α-methylstyrene dimer; terpinolene; and the like. Among these, alkylmercaptans having 12 or less carbon atoms are preferable, n-octyl mercaptan or n-dodecyl mercaptan is more preferable, and n-octyl mercaptan is further preferable. As the chain transfer agent, these compounds can be used alone or in combination of two or more.

In the mixture comprised of a predetermined proportion of the polymerizable monomer component (comprising methyl methacrylate, and optionally the acrylic acid alkyl ester and the optional additional monomer) and the chain transfer agent being continuously fed to the tank reactor, the dissolved oxygen level is preferably not more than 10 ppm, more preferably not more than 5 ppm, further preferably not more than 4 ppm, most preferably not more than 3 ppm. When the dissolved oxygen level is within this range, polymerization reaction proceeds smoothly and a formed article free of silver streak or discoloration tends to be obtained. The dissolved oxygen level can be regulated by nitrogen purge, for example.

The radical polymerization, initiator used in the present invention is from the radical polymerization initiator (4) that is virgin and not yet undergone polymerization reaction. During polymerization reaction, the polymerization initiator is almost entirely consumed. When the radical polymerization initiator has a very long half-life, the fraction (A) may contain a radical polymerization initiator (4') remaining therein. In this case, the feed amount of the radical polymerization initiator to the tank reactor is equal to the sum of the feed amounts of the radical polymerization initiator (4) and the radical polymerization initiator (4'). The feed amount of the radical polymerization initiator (4) is determined based on information including the feed amount of the fraction (A) and the content ratio of the radical polymerization initiator (4') in the fraction (A).

The amount of the radical polymerization initiator being fed is preferably 0.0001 to 0.02 part by mass, more preferably 0.001 to 0.01 part by mass, relative to 100 parts by mass of the amount of the polymerizable monomer component being fed. The radical polymerization initiator used in the present invention, when in a solid state, is preferably dissolved in a liquid medium before being fed into the tank reactor. The liquid medium is preferably methyl methacrylate. As described above, the feed amount of the solution of the radical polymerization initiator (4) in methyl methacrylate and the content ratio of the methyl methacrylate (1") in the solution of the radical polymerization initiator (4) in methyl methacrylate are used as part of the information for use in determining the feed amount of the methyl methacrylate (1).

The radical polymerization initiator used in the present invention has a half-life of preferably 0.5 to 120 seconds, more preferably 2 to 60 seconds, at a temperature inside the tank reactor, that is, the temperature of the liquid contained, in the tank reactor. The radical polymerization initiator used in the present invention has a hydrogen abstraction ability of preferably not more than 40%, more preferably not more than 30%.

Examples of the radical polymerization initiator used in the present invention can include t-hexylperoxy isopropyl monocarbonate, t-hexylperoxy 2-ethylhexanoate, 1,1,3,3-tetramethylbutylperoxy 2-ethylhexanoate, t-butylperoxy pivalate, t-hexylperoxy pivalate, t-butylperoxy neodecanoate, t-hexylperoxy neodecanoate, 1,1,3,3-tetramethylbutylperoxy neodecanoate, 1,1-bis(t-hexylperoxy) cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), dimethyl 2,2'-azobis(2-methylpropionate), and the like. Among these, t-hexylperoxy 2-ethylhexanoate, 1,1-bis(t-hexylperoxy)cyclohexane, or dimethyl 2,2'-azobis(2-methylpropionate) is preferably used. The radical polymerization initiator can be used alone or in combination of two or more.

The hydrogen abstraction ability can be found, for example, in the Technical data from the manufacturer of the polymerization initiator (for example, Technical data from Nippon Oil & Fats Co., Ltd. "Hydrogen abstraction ability and efficiency as initiator of organic peroxides" (prepared on April, 2003)), or can be determined by the radical trapping method using an α-methylstyrene dimer, in other words, by the α-methylstyrene dimer trapping method. The determination is generally carried out as follows. First, in the presence of an α-methylstyrene dimer serving as a radical-trapping agent, the polymerization initiator is cleaved into radical fragments. Among the resulting radical fragments, a radical fragment having a low hydrogen abstraction ability adds to and is trapped by a double bond of an α-methylstyrene dimer, while a radical fragment having a high hydrogen abstraction ability abstracts hydrogen atom from cyclohexane to generate a cyclohexyl radical, the resulting cyclohexyl radical adds to and is trapped by a double bond of an α-methylstyrene dimer to generate a cyclohexane-trapped product. Then, the cyclohexane or the cyclohexane-trapped product is quantitatively assessed, and the resulting value is used to determine a ratio (molar fraction) of the amount of radical fragments having a high hydrogen abstraction ability to the theoretical amount of radical fragments generated. The resulting ratio serves as the hydrogen abstraction ability.

Although no solvent is used in bulk polymerization as a general rule, when it is necessary to regulate the viscosity of the liquid contained in the tank reactor, for example, a solvent can be contained in a reaction starting material. As the solvent, an aromatic hydrocarbon such as benzene, toluene, ethylbenzene or the like is preferable. The solvent can be used alone or in combination of two or more. The amount of the solvent is preferably not more than 30 parts by mass, more preferably not more than 10 parts by mass, relative to 100 parts by mass of the polymerizable monomer component.

The tank reactor used in the present invention usually has a stirring means for stirring the liquid contained in the tank reactor, an inlet through which the polymerizable monomer component, the chain transfer agent, and the polymerization initiator are fed into the tank reactor, and an outlet through which the liquid containing a (meth)acrylic resin is discharged from the tank reactor. The tank reactor used in the present invention may be equipped with a brine-cooling condenser. In the present invention, the amount of the liquid being fed into the tank reactor is balanced with the amount of the liquid discharged from the tank reactor so that the amount of the liquid contained in the tank reactor remains approximately constant. The amount of the liquid contained in the tank reactor is preferably not less than ¼, more preferably ¼ to ¾, and further preferably ⅓ to ⅔ the capacity of the tank reactor.

In the tank reactor used in the present invention, the inlet may be provided in the top surface of the tank reactor, or may be provided in the side surface of the tank reactor, or may be provided in the bottom surface of the tank reactor. The inlet may be provided at a height higher than the liquid level in the tank reactor or may be provided at a height lower than the liquid level in the tank reactor. The inlet may have the shape of the actual cut end of a round tube, or may have such a shape that the polymerizable monomer component and the like are widely sprinkled over the liquid surface in the tank reactor.

Examples of the stirring means can include a Maxblend stirring device, a lattice-blade-type stirring device, a propeller stirring device, a screw stirring device, a helical-ribbon stirring device, a paddle stirring device, and the like. Among these, a Maxblend stirring device is preferable in terms of homogeneous mixing.

The temperature inside the tank reactor, namely, the temperature of the liquid contained in the tank reactor is preferably 100 to 170° C. more preferably 110 to 160° C., further preferably 115 to 150° C. The liquid temperature can be controlled, for example, by external heat exchange using a jacket, a heat exchanger tube, or the like, or by self heat exchange in which a tube is provided within the tank reactor so that the reaction starting materials or the (meth)acrylic resin flows through the tube.

It is preferable that the fraction (A), the methyl methacrylate (1), the acrylic acid alkyl ester (2), the additional monomer (5), the chain transfer agent (3), and the radical polymerization initiator (4) have been mixed together by the time immediately before they reach the inlet of the tank reactor. The reaction starting materials except for the radical polymerization initiator are preferably handled in an inert atmosphere such as in nitrogen gas. In order to allow the continuous-flow operation to proceed smoothly, it is preferable to continuously supply each reaction starting material from the storing tank thereof through a tube respectively to a mixer located upstream of the tank reactor, while mixing, and then feed the resulting mixture continuously to the tank reactor. The mixer can be equipped with a dynamic stirrer or a static stirrer.

The mean residence time of the liquid in the tank reactor is preferably 0.5 to 6 hours, more preferably 1 to 5 hours, further preferably 2 to 4 hours. When the mean residence time is too short, the amount of the polymerization initiator required is great. When the amount of the polymerization initiator required is great, it tends to be difficult that the polymerization reaction or the molecular weight be adjusted. On the other hand, when the mean residence time is too long, it tends to take long until the reaction reaches a steady state and productivity tends to be low. The mean residence time can be regulated by selecting the capacity of the tank reactor and the feed amounts of the reaction starting materials.

The bulk polymerization in the present invention is usually performed until the polymerization conversion ratio reaches 40 to 70% by mass, preferably 35 to 65% by mass.

The water content of the liquid contained in the tank reactor is preferably not more than 1000 ppm, more preferably not more than 700 ppm, further preferably not more than 280 ppm. The water content can be regulated by, for example, conducting dehydration treatment of the polymerizable monomer component by means of an adsorption column or the like before feeding to the tank reactor. When the water content is not more than 1000 ppm, a resin contaminant of several micrometers to several dozen micrometers can be inhibited from occurring during polymerization reaction, and consequently when the resulting (meth)acrylic resin composition is subjected to melt shape forming into film or sheet, the film or sheet can have a significantly reduced number of blemishes having an outer diameter of several dozen micrometers attributable to the resin contaminant that serves as a nucleus.

Although the mechanism by which the occurring of the resin contaminant is thus inhibited is not clear, it is presumed that mist of the polymerizable monomer component undergoes polymerization reaction in the gas phase within the tank reactor and the resulting (meth)acrylic resin having a high molecular weight remains unmelted during melt formation and acts as a nucleus to form a blemish. Examples of the method of inhibiting this reaction from occurring in the gas phase include the above-mentioned method of reducing the water content and a method of introducing an inert gas into the gas phase within the tank reactor so that mist of the polymerizable monomer component and the like is entrained in the inert gas, condensed in a brine-cooling condenser, and discharged out of the system.

Downstream of the tank reactor, another reactor may be provided. The reactor that may be provided downstream may be a tank reactor or a tube reactor. The downstream reactor can allow the bulk polymerization to further proceed, increasing the polymerization conversion ratio to a desired value.

The liquid containing a (meth)acrylic resin thus obtained by the bulk polymerization is continuously discharged from the tank reactor (or from the downstream reactor, if any). The amount of the liquid containing a (meth)acrylic resin being discharged from the reactor is preferably balanced with the amount being fed into the reactor so that the amount of the liquid contained in the reactor remains constant.

The liquid discharged from the reactor contains the (meth) acrylic resin and the volatile component. The amount of the (meth)acrylic resin contained in the liquid is preferably 40 to 70% by mass, more preferably 35 to 65% by mass. This amount is substantially the same as the polymerization conversion ratio. When the content of the (meth)acrylic resin is high, the viscosity of the liquid contained in the reactor rises and stirring force required tends to be great. When the content of the (meth)acrylic resin is low, removal of the volatile component requires great thermal energy to be applied. When the applied thermal energy is insufficient and thereby removal of the volatile component proceeds insufficiently, the resulting formed article tends to have defective appearance such as silver streak or the like.

The (meth)acrylic resin has a weight average molecular weight (hereinafter, sometimes expressed as Mw) of preferably thirty-five thousand to two hundred thousand, more preferably forty thousand to one hundred fifty thousand, further preferably forty five thousand to one hundred thirty thousand. When Mw is too low, a formed article resulting from the (meth)acrylic resin composition tends to have poor impact resistance and poor toughness. When Mw is too high, the fluidity of the (meth)acrylic resin composition tends to be low and forming processability tends to be low.

The (meth)acrylic resin has a ratio of (weight average molecular weight)/(number average molecular weight) (hereinafter, this ratio is sometimes expressed as molecular weight distribution) of preferably 1.5 to 2.6, more preferably 1.6 to 2.3, particularly preferably 1.7 to 2.0. When the molecular weight distribution is low, forming processability of the (meth)acrylic resin composition tends to be poor. When the molecular weight distribution is high, a formed article resulting from the (meth)acrylic resin composition tends to have poor impact resistance and be brittle.

The weight average molecular weight and the number average molecular weight are the molecular weights in terms of standard polystyrene determined by GPC (gel permeation chromatography). The weight average molecular weight and the molecular weight distribution of the (meth)acrylic resin can be controlled by selecting, for example, the kinds and the amounts of the polymerization initiator and the chain transfer agent.

The liquid continuously discharged from the reactor is preferably heated with a heat exchanger. As a heat source of the heat exchanger, steam generated with a boiler or another device can be used. Alternatively, vapor of the volatile component discharged from a vented extruder can also be used as the heat source. For enhancing efficiency in flash evaporation, the liquid can be applied pressure with a pump or the like.

Then, the liquid is continuously fed to the vented extruder. A typical vented extruder has an inlet through which a liquid containing a polymer and a volatile component is fed, an outlet through which the separated polymer is discharged, at least one vent through which the separated volatile component is discharged, and a screw for transferring the polymer from the inlet to the outlet while kneading. A vent closer to the outlet than the inlet is called a front vent, and a vent farther from the outlet than the inlet is called a rear vent. The vented extruder used in the present invention may be equipped with an additive inlet at a position that is closer to the outlet than the front vent closest to the outlet.

It is preferable that the interior of the extruder is under reduced pressure for subjecting the liquid fed into the extruder to flash evaporation near the inlet.

While transferred by the screw within the extruder, the volatile component evaporates. A volatile component (B) thus evaporated is discharged through the vents. The extruder may be a single screw extruder or a twin screw extruder, for example. A typical screw has usually a feed zone, a compression zone, a metering zone, and a mixing zone, but the screw of the present invention is not particularly limited thereto. In the mixing zone, an appropriate combination of screws of various shapes having projections and depressions, grooves, and pins, such as a Dulmage-type screw, a rotor-type screw, a flute-mixing-type screw and the like, can be used.

The extruder can be equipped with a breaker plate or a screen, for example, positioned at the outlet so as to remove foreign substances, carbonized component, gel-like matter or the like. The breaker plate is typically a disc with multiple pores having diameters from 3 to 4 mm provided in a concentric arrangement. The screen is one or several metal meshes stacked together that have various aperture designs selected in accordance with the application and the purpose. To the (meth)acrylic resin prior to be extruded through the outlet, additives described below can be added through the additive inlet. A (meth)acrylic resin composition (P) obtained in this way can be made into a pellet form as well as into a powder or grain form by a known method, for ease of handling of it as a forming material. The amount of the volatile component remaining in the (meth)acrylic resin composition obtained in the present invention is preferably not more than 1% by mass, more preferably not more than 0.5% by mass. When the amount of the remaining volatile component is high, the resulting formed article tends to have defective appearance such as silver streak and the like.

The volatile component (B) discharged through the vents is continuously fed to the atmospheric distillation column. The atmospheric distillation column used in the present invention may be either a plate column or a packed column. The theoretical number of plates in the atmospheric distillation column is preferably 6 to 20.

The volatile component is typically fed to an intermediate plate of the atmospheric distillation column. So as to adjust the temperature of the volatile component fed to the temperature of the intermediate plate on which an inlet is provided, a heat exchanger is preferably provided upstream of the inlet.

The pressure at the top of the atmospheric distillation column is preferably −10 kPaG to +10 kPaG, more preferably −1 kPaG to +1 kPaG. When the pressure at the top of the atmospheric distillation column is less than −10 kPaG, the chain transfer agent is recovered but the other unwanted high boiling components are also recovered in a great amount. When the pressure at the top of the atmospheric distillation column is more than 10 kPaG, the unreacted polymerizable monomer component that should be recovered is not recovered in a sufficient amount.

The temperature at the top of the atmospheric distillation column is preferably 80 to 110° C., more preferably 90 to 100° C. When the temperature at the top of the atmospheric distillation column is lower than 80° C., not only the amount of the chain transfer agent but also the amount of the unreacted polymerizable monomer component that should be recovered may be insufficient. When the temperature at the top of the atmospheric distillation column is higher than 110° C., the temperature at the bottom of the atmospheric distillation column is also high and thereby the unreacted polymerizable monomer component undergoes polymerization within the column to make it difficult to continue operation.

The volatile component sometimes contains a dimer or a trimer in addition to the unreacted polymerizable monomer component. The dimer or the trimer may affect the properties of the (meth)acrylic resin and therefore is preferably removed by the use of the atmospheric distillation column.

Regarding the atmospheric distillation column, the low boiling fraction ($A_1$) is discharged from the top of the column through distillation and the high boiling fraction ($C_1$) is discharged from the bottom of the column. In the present invention, it is preferable that the fraction ($A_1$) containing the polymerizable monomer component and the chain transfer agent is discharged from the top of the column through distillation and the fraction ($C_1$) containing a dimer, a trimer, and the like is discharged from the bottom of the column.

The fraction ($A_1$) discharged from the top of the column through distillation is usually in a vapor state and therefore can be condensed with a condenser 115. Part of this fraction can be refluxed. Typically, refluxing is conducted by feeding a condensed liquid to the liquid phase present on the uppermost plate in the distillation column. The reflux ratio is not particularly limited but is preferably 0.4 to 2.0. The reflux ratio is represented as ($R_1$ as the amount being refluxed)/($D_1$ as the amount being discharged through distillation). The apparatus shown in FIG. 2 can temporarily store the condensed fraction ($A_1$) in the tank and then divide the condensed fraction into a portion to flow through a reflux tube $R_1$ and a portion to flow through a distillation tube $D_1$, respectively, and can regulate a reflux ratio with a flow control valve (not shown).

The high boiling fraction ($C_1$) discharged from the bottom of the atmospheric distillation column is continuously fed to the vacuum distillation column. The vacuum distillation column used in the present invention may be either a plate column or a packed column. The theoretical number of plates in the vacuum distillation column is preferably 6 to 20. Because a great amount of the unreacted polymerizable monomer component has been discharged through distillation in the atmospheric distillation column, the amount of the high boiling fraction ($C_1$) continuously fed to the vacuum distillation column is relatively small and thereby the diameter of the vacuum distillation column may be designed small. The diameter of the vacuum distillation column is preferably smaller than the diameter of the atmospheric distillation column.

The vacuum distillation column adopts vacuumed conditions and thereby allows easy separation of the chain transfer agent from the other, high boiling components, leading to efficient recovery of the chain transfer agent at a high yield.

The high boiling fraction ($C_1$) is typically fed to the intermediate plate of the vacuum distillation column. So as to adjust the temperature of the high boiling fraction ($C_1$) to the temperature of the intermediate plate on which an inlet is provided, a heat exchanger may be provided upstream of the inlet.

The pressure at the top of the vacuum distillation column is usually −50 kPaG to −101 kPaG, preferably −90 kPaG to −101 kPaG. The temperature at the top of the vacuum distillation column is preferably 30 to 80° C., more preferably 40 to 70° C.

Regarding the vacuum distillation column, the low boiling fraction ($A_2$) is discharged from the top of the column through distillation and the high boiling fraction ($C_2$) is discharged from the bottom of the column. In the present invention, it is preferable that the fraction ($A_2$) containing the polymerizable monomer component and the chain transfer agent is discharged from the top of the column through distillation and the fraction ($C_2$) containing a dimer, a trimer, and the like is discharged from the bottom of the column. The fraction ($C_2$) discharged from the bottom of the vacuum distillation column may be discarded after predetermined treatment. The amount of the fraction ($C_2$) is preferably not more than 1% relative to the amount of the volatile component (B). The amount of the mixture (fraction (A)) consisting of the low boiling fraction ($A_1$) and the low boiling fraction ($A_2$) is preferably not less than 99% relative to the amount of the volatile component (B).

In the present invention, a polymerization inhibitor may be added to the low boiling fraction ($A_1$) or ($A_2$). Addition of the polymerization inhibitor is preferably conducted in the condenser 115, which is provided for condensing the fraction ($A_1$). Examples of the polymerization inhibitor can include nitroso compounds such as nitrosobenzene, methyl-α-nitrosoisopropyl ketone, N-nitrosophenylhydroxylamine aluminum salt, N-nitrosophenylhydroxyamine ammonium salt and the like; nitrone compounds such as phenyl-t-butylnitrone and the like; quinones such as hydroquinone, p-benzoquinone, 2,5-dichloro-p-benzoquinone, 2,6-dichloro-p-benzoquinone, t-butylhydroquinone, tetrachloro-p-benzoquinone and the like; nitro compounds such as dinitrobenzene, 1,3,5-trinitrobenzene, 1,3,5-trinitrotoluene and the like; nitrophenols such as nitrophenol, dinitrophenol, trinitrophenol and the like; butylxylenol, p-methoxyphenol, N,N-diethylhydroxylamine, iron (III) chloride, diphenylpicrylhydrazyl, furfurylidene malononitrile, oxygen, sulfur; and the like. The polymerization inhibitor may be added as it is but is preferably added after dissolved in methyl methacrylate. The amount of the polymerization inhibitor in the fraction (A) is not particularly limited but is preferably 1 to 20 ppm, more preferably 1 to 10 ppm.

As described above, the fraction (A) contains methyl methacrylate, and optionally the acrylic acid alkyl ester or the additional monomer, and the chain transfer agent. Therefore, the fraction (A) can be reused as part of the reaction starting materials.

The b* value of the fraction (A) is preferably −1 to 2, more preferably −0.5 to 1.5. The b* value within this range is advantageous because the resulting (meth)acrylic resin composition efficiently gives a formed article having little discoloration. The b* value is a value measured in accordance with the standard defined by the International Commission on Illumination (CIE) (1976) or JIS Z-8722.

In the present invention, the amount of the dimer derived from the polymerizable monomer component contained in the mixture (fraction (A)) consisting of the low boiling fraction ($A_1$) and the low boiling fraction ($A_2$) is preferably less than 0.1% by mass, more preferably not more than 0.05% by mass. The amount of the chain transfer agent contained in the fraction (A) is preferably not less than 50% by mass, more preferably not less than 70% by mass, relative to the amount of the chain transfer agent contained in the volatile component separated with the use of the vented extruder.

Examples of the additives that are added to the (meth) acrylic resin can include an antioxidant, a thermal degradation inhibitor, an ultraviolet absorber, a light stabilizer, a lubricant, a mold release agent, a polymer processing aid, an antistatic agent, a flame retardant, a dye and a pigment, a light dispersing agent, an organic coloring agent, a delustering agent, an impact resistance modifier, a fluorescent substance, and the like. The amount of the additives is preferably not more than 0.5% by mass, more preferably not more than 0.2% by mass, relative to the amount of the (meth)acrylic resin composition. When the amount of the additives is too great, a formed article may have defective appearance such as silver streak and the like.

The antioxidant by itself has an effect to prevent oxidative degradation of a resin from being caused in the presence of oxygen. Examples of the antioxidant can include phosphorus antioxidants, hindered phenol antioxidants, thioether antioxidants, and the like. The antioxidant can be used alone or in combination of two or more. Among these, from the viewpoint of the effect to prevent optical properties from being impaired due to discoloration, phosphorus antioxidants or hindered phenol antioxidants is preferable, and concurrent use of a phosphorus antioxidant and a hindered phenol antioxidant is more preferable.

When a phosphorus-based antioxidant and a hindered phenol antioxidant are concurrently used, the proportion therebetween is not particularly limited but is preferably 1/5 to 2/1, more preferably 1/2 to 1/1, in terms of the mass ratio of the phosphorus antioxidant to the hindered phenol antioxidant.

As the phosphorus antioxidant, preferable is 2,2-methylenebis(4,6-di-t-butylphenyl)octyl phosphite (manufactured by ADEKA Corporation, trade name: ADK STAB HP-10), tris(2,4-di-t-butylphenyl) phosphite (manufactured by Ciba Specialty Chemicals, trade name: IRGAFOS 168), 3,9-bis (2,6-di-t-butyl-4-methylphenoxy)-2,4,8,10-tetraoxa-3,9-diphosphaspiro [5.5]undecane (manufactured by ADEKA Corporation, trade name: ADK STAB PEP-36) or the like.

As the hindered phenol antioxidant, preferable is pentaerythrityl-tetrakis [3-(3,5-di-t-butyl-4-hydroxy phenyl) propionate] (manufactured by Ciba Specialty Chemicals, tradename: IRGANOX 1010), octadecyl-3-(3,5-di-t-butyl-4-hydroxyphenyl)propionate (manufactured by Ciba Specialty Chemicals, trade name: IRGANOX 1076) or the like.

The thermal degradation inhibitor can trap a polymer radical that generated at high heat in the practical absence of oxygen and therefore can prevent thermal degradation of the resin.

As the thermal degradation inhibitor, preferable is 2-t-butyl-6-(3'-t-butyl-5'-methyl-hydroxybenzyl)-4-methylphenyl acrylate (manufactured by Sumitomo Chemical Company, trade name: SUMILIZER GM) 2,4-di-t-amyl-6-(3',5'-di-t-amyl-2'-hydroxy-α-methylbenzyl)phenyl acrylate (manufactured by Sumitomo Chemical Company, Limited, trade name: SUMILIZER GS), or the like.

The ultraviolet absorber is a compound capable of absorbing ultraviolet light. The ultraviolet absorber is a compound known to have a primary function of converting light energy into thermal energy.

As the ultraviolet absorber, mentioned are benzophenones, benzotriazoles, triazines, benzoates, salicylates, cyanoacrylates, oxalic anilides, malonic acid esters, formamidines, and the like. The ultraviolet absorber can be used alone or in combination of two or more.

Preferable among these are benzotriazoles, or ultraviolet absorbers having a maximum molar absorption coefficient $\varepsilon_{max}$ of not more than 1200 dm$^3$ mol$^{-1}$ cm$^{-1}$ at a wavelength of 380 to 450 nm.

Benzotriazoles effectively inhibit optical properties from being impaired due to, for example, discoloration caused by ultraviolet exposure, and therefore are preferable as an ultraviolet absorber used when the (meth)acrylic resin composition is used in applications where such a property is required.

As the benzotriazoles, preferable is 2-(2H-benzotriazol-2-yl)-4-(1,1,3,3-tetramethylbutyl)phenol (manufactured by Ciba Specialty Chemicals, trade name: TINUVIN 329), 2-(2H-benzotriazol-2-yl)-4,6-bis(2-methyl-1-phenylethyl), phenol (manufactured by Ciba Specialty Chemicals, trade name: TINUVIN 234), 2,2'-methylenebis[4-t-octylphenol-6-(2H-benzotriazol-2-yl)] (manufactured by ADEKA Corporation, LA-31), 2-(5-octylthio-2H-benzotriazol-2-yl)-6-tert-butyl-4-methylphenol or the like.

The ultraviolet absorbers having a maximum molar absorption coefficient $\varepsilon_{max}$ of not more than 1200 dm$^3$ mol$^{-1}$ cm$^{-1}$ at a wavelength of 380 to 450 nm can inhibit yellowing of the resulting formed article.

The maximum molar absorption coefficient, $\varepsilon_{max}$, of the ultraviolet absorber is measured as follows. To 1 L of cyclohexane, 10.00 mg of the ultraviolet absorber is added and dissolved until no undissolved matter is visually observed. The resulting solution is poured into a quartz glass cell of 1 cm×1 cm×3 cm and the absorbance at a wavelength of 380 to 450 nm is measured using a U-3410 spectrophotometer manufactured by Hitachi, Ltd. Using the molecular weight (Mw) of the ultraviolet absorber and the maximum absorbance ($A_{max}$) thus measured, the maximum molar absorption coefficient, $\varepsilon_{max}$, is calculated by formula:

$$\varepsilon_{max}=[A_{max}/(10\times10^{-3})]\times Mw$$

As the ultraviolet absorbers having a maximum molar absorption coefficient $\varepsilon_{max}$ of not more than 1200 dm$^3$ mol$^{-1}$ cm$^{-1}$ at a wavelength of 380 to 450 nm, mentioned are 2-ethyl-2'-ethoxy-oxalic anilide (manufactured by Clariant (Japan) K.K., tradename: Sanduvor VSU) and the like.

Among these ultraviolet absorbers, from the viewpoint that degradation of the resin caused by ultraviolet exposure is inhibited, benzotriazoles are preferably used.

The light stabilizer is a compound that is known to have a primary function of trapping a radical generated by oxidation due to light. Preferable examples of the light stabilizer can include hindered amines such as compounds having a 2,2,6,6-tetraalkylpiperidine skeleton, and the like.

The mold release agent is a compound that has a function of facilitating release of a formed article from a mold. Examples of the mold release agent can include higher alcohols such as cetyl alcohol, stearyl alcohol and the like, glycerol higher fatty acid esters such as stearic acid monoglyceride, stearic acid diglyceride and the like. As the mold release agent in the present invention, a higher alcohol and a glycerol fatty acid monoester are preferably used in combination. When a higher alcohol and a glycerol fatty acid monoester are used in combination, the proportion therebetween is not particularly limited but is preferably 2.5/1 to 3.5/1, more preferably 2.8/1 to 3.2/1, in terms of the mass ratio of the higher alcohol to the glycerol fatty acid monoester.

The polymer processing aid is a compound that effectively achieves an accurate thickness and gives a thin film when forming a (meth)acrylic resin composition. The polymer processing aid is usually a polymer particle with a particle diameter of 0.05 to 0.5 μm that can be produced by the emulsion polymerization method.

The polymer particle may be a monolayer particle composed of a polymer having a single composition ratio and a single limiting viscosity, or may be a multilayer particle composed of two or more polymers having different composition ratios or different limiting viscosities. Among these, preferable examples thereof include, for example, particles having a two-layer structure where the inner layer is a polymer layer with a low limiting viscosity and the outer layer is a polymer layer with a high limiting viscosity of not less than 5 dl/g.

The polymer processing aid preferably has a limiting viscosity of 3 to 6 dl/g. When the limiting viscosity thereof is too low, the effect to improve formability is low. When the limiting viscosity thereof is too high, the melt fluidity of the (meth)acrylic resin composition is likely to be low.

Examples of the impact resistance modifier that may be added to the (meth)acrylic resin composition can include core-shell modifiers containing acrylic rubber or diene rubber as a core layer component; modifiers containing a plurality of rubber particles; and the like.

Preferable as the organic coloring agent is a compound that has a function of converting ultraviolet light, which is thought to be harmful to a resin, into visible light.

Examples of the light dispersing agent and the delustering agent can include glass microparticles, polysiloxane crosslinked microparticles, crosslinked polymer microparticles, talc, calcium carbonate, barium sulfate, and the like.

Examples of the fluorescent substance can include fluorescent pigments, fluorescent dyes, fluorescent white dyes, fluorescent brighteners, fluorescent bleaching agents, and the like.

In the (meth)acrylic resin composition by the method of the present invention, the b* value as measured in terms of a length of 200 mm of a formed article made of the (meth)acrylic resin composition at a temperature of 260° C. is preferably not more than 4, more preferably not more than 3.5.

The (meth)acrylic resin composition obtained by the method of the present invention can be formed by a conventionally known forming method such as injection molding, compression molding, extrusion, vacuum forming and the like, to obtain various formed articles. Examples of the formed articles made of the (meth)acrylic resin composition can include parts of advertising signs such as advertising pillars, sign stands, projecting signs, door-top signs, roof-top signs and the like; display parts such as showcases, dividers, store display parts and the like; lighting fixture parts such as fluorescent lamp covers, mood lighting covers, lampshades, luminous ceilings, luminous walls, chandeliers and the like; parts of interior furnishings such as pendants, mirrors and the like; building parts such as doors, domes, safety window panes, partitions, stair skirting boards, balcony skirting boards, roofs of buildings for recreational use and the like; carrier-related parts such as aircraft windshields, pilot visors, motorcycle windshields, motorboat windshields, visors for buses, side visors for automobiles, rear visors, head wings, headlight covers and the like; electronics parts such as nameplates for audiovisuals, stereo covers, television protection masks, vending machines and the like; parts of medical equipment such as incubators, X-ray machines and the like; parts related to instruments, such as machinery covers, gauge covers, experiment instruments, rulers, dials, view windows and the like; optics-related parts such as protective plates for liquid crystal, light guide plates, light guide films, Fresnel lenses, lenticular lenses, front plates of various displays, light dispersing plates and the like; traffic-related parts such as traffic signs, direction boards, traffic mirrors, noise barrier walls and the like; film parts such as protective films for polarizers, protective films for polarizer plates, retardation films, surface materials for automotive interior, surface materials for mobile phones, marking films and the like; appliance parts such as lid materials and control panels of washers, top panels of rice cookers and the like; other items such as greenhouses, large aquariums and water tanks, box-shaped aquariums and water tanks, clock panels, bathtubs, sanitary wares, desk, mats, gaming parts, toys, and welding masks for facial protection; and the like.

The present invention will be described more specifically by examples and comparative examples. The present invention is, however, not limited to these examples.

Example 1

Figure 1:
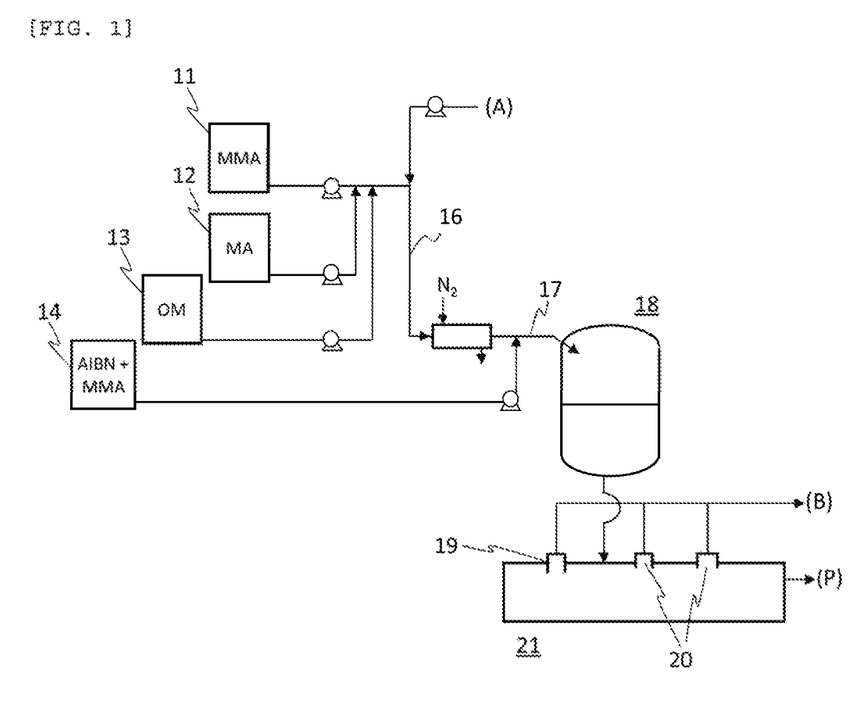
FIG. 1 an illustration of an apparatus used for implementing a polymerization step and a devolatization step in the production method according to the present invention.
Figure 2:
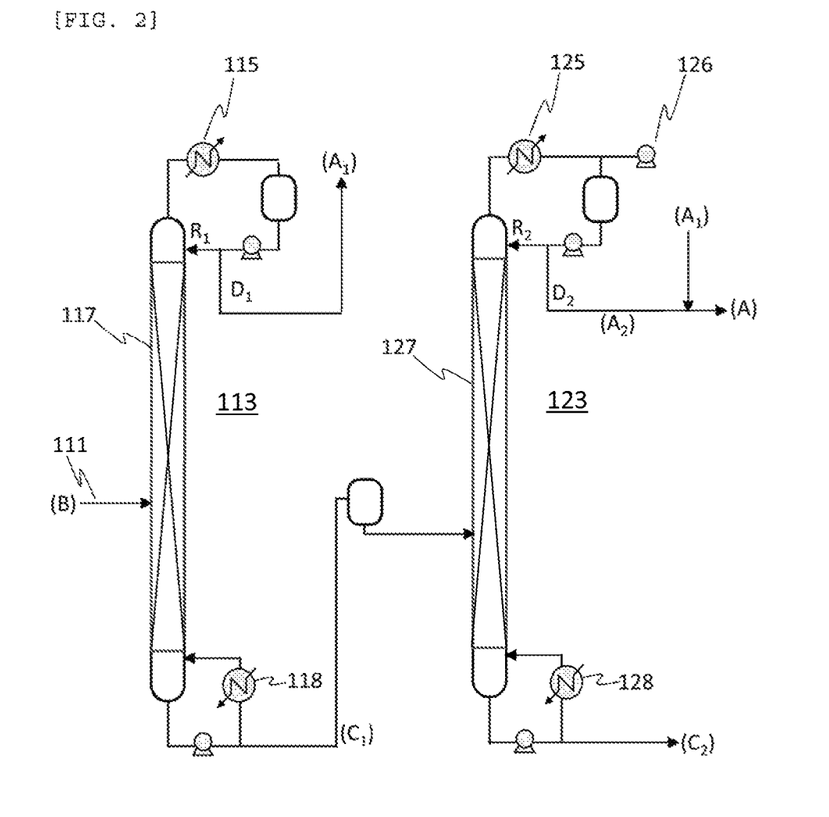
FIG. 2 an illustration of an apparatus used for implementing a distillation step of the production method according to the present invention.

Apparatuses shown in FIG. 1 and FIG. 2 were used. Into a continuous-flow tank reactor 18 (capacity: 0.1 m³, tank diameter: 500 mm, Maxblend blade, blade diameter: 260 mm, rotational speed: 200 rpm) equipped with a brine-cooling condenser, 73.6 kg of methyl methacrylate (hereinafter, sometimes called MMA), 6.4 kg of methyl acrylate (hereinafter, sometimes called MA), and 360 g of n-octyl mercaptan (hereinafter, sometimes called OM) were charged, followed by performing replacement of the atmosphere inside the tank reactor 18 with nitrogen gas and then raising the temperature inside the tank reactor 18 to 140° C.

After the temperature inside the tank reactor 18 reached 140° C., reaction starting materials consisting of 94 parts by mass of methyl methacrylate, 6 parts by mass of methyl acrylate, 0.35 part by mass of n-octyl mercaptan, and 0.0065 part by mass of 2,2'-azobis 2-methylpropionitrile (hereinafter, sometimes called AIBN) were fed to the tank reactor 18 so as to achieve a mean residence time of 2.5 hours.

Simultaneously with the start of feeding of the reaction starting materials, liquid was started to be discharged from the bottom of the tank reactor 18 so as to maintain a constant liquid level of the liquid within the tank reactor 18. The compositional ratio of the reaction starting materials and the conditions of the polymerization reaction are shown in Table 1.

TABLE 1

|  | Ex. | | Comp. Ex. | |
| --- | --- | --- | --- | --- |
|  | 1 | 2 | 1 | 2 |
| Compositional ratio of reaction starting materials [parts by mass] | | | | |
| MMA | 94 | 94 | 94 | 98 |
| MA | 6 | 6 | 6 | 2 |
| OM | 0.35 | 0.35 | 0.35 | 0.25 |
| AIBN | 0.0065 | 0.0065 | 0.0065 | 0.0050 |
| Conditions of polymerization reaction | | | | |
| Reaction Temp. [° C.] | 140 | 140 | 140 | 140 |
| Polymerization conversion ratio [%] | 57 | 57 | 57 | 50 |
| mean residence time [hr] | 2.5 | 2.5 | 2.5 | 2.5 |

The reaction starting materials were prepared as follows: a fraction (A) described below was analyzed by gas chromatography, and thereby the contents of MMA, MA, and OM in the fraction (A) were determined. From storage tanks 11, 12, 13, and 14, MMA, MA, OM, and AIBN were supplied and added to the fraction (A) so as to achieve a proportion of 94 parts by mass of MMA, 6 parts by mass of MA, 0.35 part by mass of OM, and 0.0065 part by mass of AIBN. Thus, the reaction starting materials were prepared. In order to transfer the fraction (A), a canned pump was used. At the start of operation when no fraction (A) had been discharged through distillation yet, the reaction starting materials were prepared by using only MMA, MA, OM, and AIBN from the storage tanks 11, 12, 13, and 14.

(Devolatizing Treatment)

The liquid discharged from the tank reactor 18 was fed into a heater (not shown), warmed to 230° C. in the heater, and then at a constant flow rate, fed into a vented extruder 21 that was controlled at 250° C. The vented extruder separated a volatile component (B) from a (meth)acrylic resin (P), and extruded the (meth)acrylic resin (P) in a form of strand. The strand was cut with a pelletizer, and a (meth)acrylic resin composition was obtained as a pellet. The volatile component (B) was discharged in a vapor state through vents 19 and 20.

(First Distillation Column)

The volatile component (B) in a vapor state was cooled in a heat exchanger (not shown) into a liquid state. The resulting volatile component (B) in a liquid state was fed to an intermediate plate (weir-less tray) of a first distillation column 113 (pressure at column top: 0.1 kPaG, column diameter: 200 A (219 mm), weir-less tray, 10 plates). Heating was conducted with a reboiler 118 provided at the bottom of the column, for atmospheric distillation (temperature at column top: 98° C., temperature at column bottom: 125° C., reflux ratio $R_1/D_1$: 1). Then, a low boiling fraction ($A_1$) was discharged from the top of the column through distillation, and a high boiling fraction ($C_1$) was discharged from the bottom of the column.

(Second Distillation Column)

The high boiling fraction ($C_1$) was fed to an intermediate plate (weir-less tray) of a second distillation column 123 (pressure at column top: −98 kPaG, column diameter: 100 A (114 mm), weir-less tray, 10 plates). Heating was conducted with a reboiler 128 provided at the bottom of the column, and vacuuming was conducted with a pump 126 provided at the top of the column, for vacuum distillation (temperature at column top: 60° C., temperature at column bottom: 125° C., reflux ratio $R_2/D_2$:1). Then, a low boiling fraction ($A_2$) was discharged from the top of the column through distillation, and a high boiling fraction ($C_2$) was discharged from the bottom of the column.

The low boiling fraction ($A_1$) and the low boiling fraction ($A_2$) were mixed in a recovery tank (not shown) to obtain the fraction (A).

When the steady state was reached, each of the volatile component (B), the low boiling fraction ($A_1$), the high boiling fraction ($C_1$), the low boiling fraction ($A_2$), and the fraction (A) was analyzed by gas chromatography, and thereby the contents of MMA, MA, OM, and dimers were determined. Besides, when the steady state was reached, the liquid discharged from the tank reactor 18 was analyzed by gas chromatography, and thereby the polymerization conversion ratio was determined. Results are shown in Table 2.

Analysis of the volatile component (B) and the low boiling fraction ($A_1$) was performed on a gas chromatograph GC-14A manufactured by Shimadzu. Corporation to which a column (GLC-G-230 manufactured by Sciences Inc., INERT CAR 1 (df=0.4 μm, I.D.=0.25 mm, length=60 m)) was attached, under conditions where the injection temperature was 180° C., the detector temperature was 180° C., and the column temperature was raised from 60° C. to reach 200° C. at a temperature raising rate of 10° C./minute. Thus, a chromatogram was obtained.

Analysis of the high boiling fraction ($C_1$), the low boiling fraction ($A_2$), and the fraction (A) was performed on a gas chromatograph GC-14A manufactured by Shimadzu Corporation to which a column (GLC-G-230 manufactured by Sciences Inc. INERT CAP 1 (df=1.0 μm, I.D.=1.2 mm, length=40 m)) was attached, under conditions where the injection temperature was 270° C., the detector temperature was 270° C., and the column temperature was raised from 70° C. to reach 270° C. at a temperature raising rate of 10° C./minute. Thus, a chromatogram was obtained.

Analysis of the liquid discharged from the tank reactor 18 was performed on a gas chromatograph GC-14 A manufactured by Shimadzu Corporation to which a column (GLC-G-230 manufactured by Sciences Inc., INERT CAP 1 (df=0.4 μm, I.D.=0.25 mm, length=60 m)) was attached, under conditions where the injection temperature was 180° C., the detector temperature was 180° C., and the column temperature was raised from 60° C. to reach 200° C. at a temperature raising rate of 10° C./minute. Thus, a chromatogram was obtained.

Example 2

A (meth)acrylic resin composition was produced in the same manner as in Example 1 except that the temperature at the top of the second distillation column 123 was 51° C. and the pressure at the top of the second distillation column 123 was −97.5 kPaG. When the steady state was reached, each of the volatile component (B), the low boiling fraction ($A_1$), the high boiling fraction ($C_1$), the low boiling fraction ($A_2$), and the fraction (A) was analyzed by gas chromatography, and thereby the contents of MMA, MA, OM, and dimers were determined. Besides, when the steady state was reached, the liquid discharged from the tank reactor 18 was analyzed by gas chromatography, and thereby the polymerization conversion ratio was determined. Results are shown in Table 2.

Comparative Example 1

Apparatuses shown in FIG. 1 and FIG. 2 were used. Into a continuous-flow tank reactor 18 (capacity: 0.1 m³, tank diameter: 500 mm. Maxblend blade, blade diameter: 260 mm, rotational speed: 200 rpm) equipped with a brine-cooling condenser, 73.6 kg of MMA, 6.4 kg of MA, and 360 g of OM were charged, followed by performing replacement of the atmosphere inside the tank reactor 18 with nitrogen gas and then raising the temperature inside the tank reactor 18 to 140° C.

After the temperature inside the tank reactor 18 reached 140° C., reaction starting materials consisting of 94 parts by mass of MMA, 6 parts by mass of MA, 0.35 part by mass of OM, and 0.0065 part by mass of AIBN were fed to the tank reactor 18 so as to achieve a mean residence time of 2.5 hours.

Simultaneously with the start of feeding of the reaction starting materials, liquid was started to be discharged from the bottom of the tank reactor 18 so as to maintain a constant liquid level of the liquid within the tank reactor 18. The compositional ratio of the reaction starting materials and the conditions of the polymerization reaction are shown in Table 1.

The reaction starting materials were prepared as follows. A fraction (A) described below was analyzed by gas chromatography, and thereby the contents of MMA, MA, and OM in the fraction (A) were determined. From storage tanks 11, 12, 13, and 14, MMA, MA, OM, and AIBN were supplied and added to the fraction (A) so as to achieve a proportion of 94 parts by mass of MMA, 6 parts by mass of MA, 0.35 part by mass of OM, and 0.0065 part by mass of AIBN. Thus, the reaction starting materials were prepared. In order to transfer the fraction (A), a canned pump was used. At the start of operation when no fraction (A) had been discharged through distillation yet, the reaction, starting materials were prepared by using only MMA, MA, OM, and AIBN from the storage tanks 11, 12, 13, and 14.

The liquid discharged from the tank reactor 18 was fed into a heater (not shown), warmed to 230° C. in the heater, and then at a constant flow rate, fed into a vented extruder 21 that was controlled at 250° C. The vented extruder separated a volatile component (B) from a (meth)acrylic resin (P), and extruded the (meth)acrylic resin (P) in a form of strand. The strand was cut with a pelletizer, and a (meth)acrylic resin composition was obtained as a pellet. The volatile component (B) was discharged in a vapor state through vents 19 and 20.

The volatile component (B) in a vapor state was cooled in a heat exchanger (not shown) into a liquid state. The resulting volatile component (B) in a liquid state was fed to an intermediate plate (weir-less tray) of a distillation column 3 (pressure at column top: 0.1 kPaG, column diameter: 200 A (219 mm), weir-less tray, 10 plates). Heating was conducted with a reboiler 8 provided at the bottom of the column, for atmospheric distillation (temperature at column top: 98° C., temperature at column bottom: 125° C., reflux ratio R/D: 1). Then, a low boiling fraction ($A_1$) was discharged from the top of the column through distillation, and a high boiling fraction ($C_1$) was discharged from the bottom of the column. The fraction ($A_1$) was recovered in a tank and thus the fraction (A) was obtained.

When the steady state was reached, each of the volatile component (B), the low boiling fraction ($A_1$), the high boiling fraction ($C_1$), and the fraction (A) was analyzed by gas chromatography, and thereby the contents of MMA, MA, OM, and dimers were determined. Besides, when the steady state was reached, the liquid discharged from the tank reactor 18 was analyzed by gas chromatography, and thereby the polymerization conversion ratio was determined. Results are shown in Table 2.

Comparative Example 2

Figure 3:
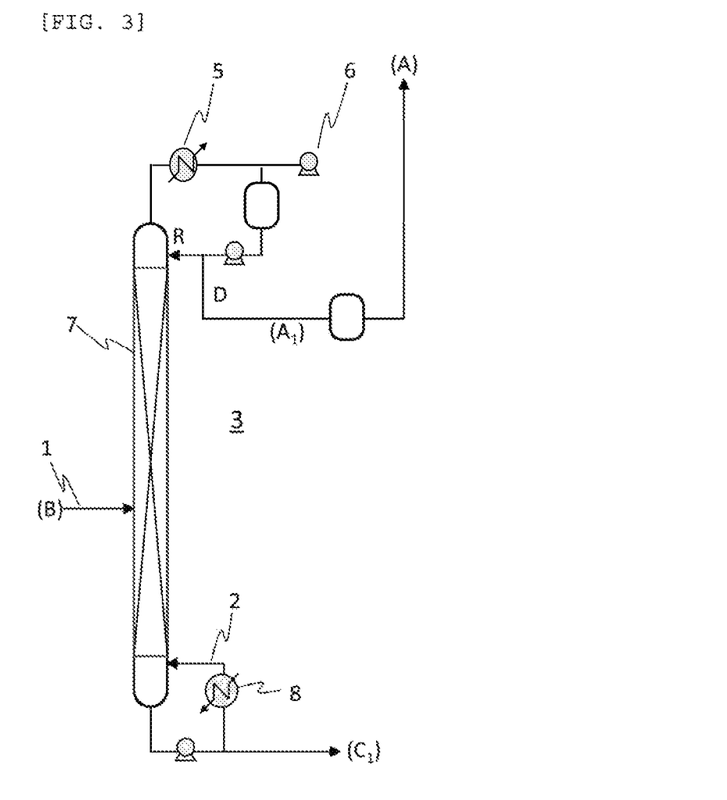
FIG. 3 an illustration of an apparatus used for implementing a distillation step in a conventional method.

Apparatuses shown in FIG. 1 and FIG. 3 were used. Into a continuous-flow tank reactor 18 (capacity: 0.1 m³, tank diameter: 500 mm, Maxblend blade, blade diameter: 260 mm, rotational speed: 200 rpm) equipped with a brine-cooling condenser, 73.6 kg of MMA, 6.4 kg of MA, and 360 g of OM were charged, followed by performing replacement of the atmosphere inside the tank reactor 18 with nitrogen gas and then raising the temperature inside the tank reactor 18 to 140° C.

After the temperature inside the tank reactor 18 reached 140° C., reaction starting materials consisting of 93 parts by mass of MMA, 2 parts by mass of MA, 0.25 part by mass of OM, and 0.0050 part by mass of AIBN were fed to the tank reactor 18 so as to achieve a mean residence time of 2.5 hours.

Simultaneously with the start of feeding of the reaction starting materials, liquid was started to be discharged from the bottom of the tank reactor 18 so as to maintain a constant liquid level of the liquid within the tank reactor 18. The compositional ratio of the reaction starting materials and the conditions of the polymerization reaction are shown in Table 1.

The reaction starting materials were prepared as follows. A fraction (A) described below was analyzed by gas chromatography, and thereby the contents of MMA, MA, and OM in the fraction (A) were determined. From storage tanks 11, 12, 13, and 14, MMA, MA, OM, and AIBN were supplied and added to the fraction (A) so as to achieve a proportion of 98 parts by mass of MMA, 2 parts by mass of MA, 0.25 part by mass of OM, and 0.0050 part by mass of AIBN to obtain the reaction starting materials. In order to transfer the fraction (A), a canned pump was used. At the start of operation when no fraction (A) had been discharged through distillation yet, the reaction starting materials were prepared by using only MMA, MA, OM and AIBN from the storage tanks 11, 12, 13, and 14.

The liquid discharged from the tank reactor 18 was fed into a heater (not shown), warmed to 230° C. in the heater, and then at a constant flow rate, fed into a vented extruder 21 that was controlled at 250° C. The vented extruder separated a volatile component (B) from a (meth)acrylic resin (P), and extruded the (meth)acrylic resin (P) in a form of strand. The strand was cut with a pelletizer, and a (meth)acrylic resin composition was obtained as a pellet. The volatile component (B) was discharged in a vapor state through vents 19 and 20.

The volatile component (B) in a vapor state was cooled in a heat exchanger (not shown) into a liquid state. The resulting volatile component (B) in a liquid state was fed to an intermediate plate (weir-less tray) of a distillation column 3 (pressure at column top: −84.0 kPaG, column diameter: 200 A (219 mm), weir-less tray, 10 plates). Heating was conducted with a reboiler 8 provided at the bottom of the column and vacuuming was conducted with a pump 6 provided at the top of the column, for vacuum distillation (temperature at column top: 55° C., temperature at column bottom: 125° C., reflux ratio R/D: 1). Then, a low boiling fraction ($A_1$) was discharged from the top of the column through distillation, and a high boiling fraction ($C_1$) was discharged from the bottom of the column. The fraction ($A_1$) was recovered in a tank and thus the fraction (A) was obtained.

When the steady state was reached, each of the volatile component (B), the low boiling fraction ($A_1$), the high boiling fraction ($C_1$), and the fraction (A) was analyzed by gas chromatography, and thereby the contents of MMA, MA, OM, and dimers were determined. Besides, when the steady state was reached, the liquid discharged from the tank reactor 18 was analyzed by gas chromatography, and thereby the polymerization conversion ratio was determined. Results are shown in Table 2.

TABLE 2

|  | Ex. | | Comp. Ex. | |
| --- | --- | --- | --- | --- |
|  | 1 | 2 | 1 | 2 |
| Compositional ratio of volatile component (B) [mass %] | | | | |
| MMA | 91.1 | 91.1 | 91.1 | 96.8 |
| MA | 8.10 | 8.10 | 8.10 | 2.50 |
| OM | 0.34 | 0.34 | 0.34 | 0.25 |

TABLE 2-continued

|  | Ex. | | Comp. Ex. | |
| --- | --- | --- | --- | --- |
|  | 1 | 2 | 1 | 2 |
| Dimers | 0.24 | 0.24 | 0.24 | 0.33 |
| Others | 0.22 | 0.22 | 0.22 | 0.12 |
| First distillation column | | | | |
| Temperature at top [° C.] | 98 | 98 | 98 | 55 |
| Presure at top [kPaG] | 0.1 | 0.1 | 0.1 | −84 |
| Compositional ratio of low boiling fraction ($A_1$) [mass %] | | | | |
| MMA | 91.7 | 91.7 | 91.7 | 96.9 |
| MA | 7.90 | 7.90 | 7.90 | 2.38 |
| OM | N.D. | N.D. | N.D. | 0.12 |
| Dimers | N.D. | N.D. | N.D. | 0.40 |
| Others | 0.40 | 0.40 | 0.40 | 0.20 |
| Compositional ratio of high boiling fraction ($C_1$) [mass %] | | | | |
| MMA | 35.6 | 35.6 | 35.6 | 35.4 |
| MA | 0.80 | 0.80 | 0.80 | 21.8 |
| OM | 27.5 | 27.5 | 27.5 | 30.1 |
| Dimers | 21.3 | 21.3 | 21.3 | 5.50 |
| Others | 14.8 | 14.8 | 14.8 | 7.20 |
| Second distillation column | | | | |
| Temperature at top [° C.] | 60 | 51 | — | — |
| Presure at top [kPaG] | −98.0 | −97.5 | — | — |
| Compositional ratio of low boiling fraction ($A_2$) [mass %] | | | | |
| MMA | 64.5 | 66.1 | — | — |
| MA | 1.10 | 1.30 | — | — |
| OM | 32.3 | 31.5 | — | — |
| Dimers | 0.600 | 0.100 | — | — |
| Others | 1.50 | 1.00 | — | — |
| Properties of fraction(A) (= ($A_1$) + ($A_2$)) | | | | |
| OM Conc. [mass %] | 0.2711 | 0.2644 | <0.0005 | 0.1200 |
| Dimer Conc. [mass %] | 0.005 | <0.001 | <0.001 | 0.400 |
| Recovery ratio of chain transfer agent [mass %] | 79.3 | 77.4 | 0.0 | 47.5 |
| mass ratio of Fraction (A)/Volatile component (B) | 0.9949 | 0.9948 | 0.9878 | 0.9896 |

* "N.D." means "not detactable"

In Examples 1 and 2 in which an atmospheric distillation column and a vacuum distillation column were both used, the mass ratio of the fraction (A) to the volatile component (B) was close to 1, which indicates that the volatile component (B) was recovered at a high yield. Also in these examples, the dimer concentration in the fraction (A) was low, which indicates that the recovery ratio of the chain transfer agent was enough high.

Therefore, in Examples 1 and 2, an unreacted polymerizable monomer component and an unreacted chain transfer agent were recovered at a high efficiency and because of the low dimer content, reusing the recovered component as part of reaction starting materials can achieve production of a (meth)acrylic resin composition without causing discoloration or the like and consequently impairing transparency.

In Comparative Example 1 in which an atmospheric distillation column was used alone, although the volatile component (B) was recovered at a high yield, the chain transfer agent was not recovered sufficiently. This phenomenon is attributed to the following: in distillation by the use of the atmospheric distillation column, the chain transfer agent, which had a boiling point higher than those of MMA and the like, was not recovered as the fraction (A) but discharged as the high boiling fraction ($C_1$).

In Comparative Example 2 in which a vacuum distillation column was used alone, although the volatile component (B) was recovered at a high yield, the dimer concentration in the fraction (A) was relatively high. This phenomenon is attributed to the following: in distillation by the use of the vacuum distillation column, dimers, which had a boiling point higher than those of MMA and the like, were discharged through distillation as the low boiling fraction ($A_1$) and then recovered as the fraction (A).

EXPLANATION OF SYMBOLS

11: tank for storing MMA
12: tank for storing MA
13: tank for storing OM
14: tank for storing solution of AIBN in MMA
18: tank reactor
19: rear vent
20: front vents
21: vented extruder
1, 111: feeding line
2, 113, 123: distillation column
D, $D_1$, $D_2$: distillation tube
R, $R_1$, $R_2$: reflux tube
5, 115, 125: condenser
6, 126: vacuum pump
7, 117, 118: plate
8, 118, 128: reboiler

The invention claimed is:

1. A method of producing a (meth)acrylic resin composition, comprising:
   continuously feeding reaction starting materials to a tank reactor, the reaction starting materials comprising a polymerizable monomer component, a chain transfer agent and a radical polymerization initiator, the polymerizable monomer component comprising 50 to 100% by mass of methyl methacrylate, 0 to 20% by mass of an acrylic acid alkyl ester and 0 to 30% by mass of an additional monomer;
   conducting bulk polymerization of the polymerizable monomer component at a polymerization conversion ratio of 40 to 70% by mass to obtain a liquid comprising a (meth)acrylic resin;
   continuously feeding the resulting liquid to a vented extruder to separate A volatile component from the (meth)acrylic resin;
   conducting distillation using an atmospheric distillation column to separate the resulting volatile component into a high boiling fraction ($C_1$) and a low boiling fraction ($A_1$);
   conducting distillation using a vacuum distillation column having a pressure of −50 kPaG to −101 kPaG at the top of the vacuum distillation column to separate the high boiling fraction ($C_1$) into a high boiling fraction ($C_2$) and a low boiling fraction ($A_2$); and
   reusing the low boiling fraction ($A_1$) and the low boiling fraction ($A_2$) as part of the reaction starting materials.

2. The method according to claim 1, wherein a mixture of the low boiling fraction ($A_1$) and the low boiling fraction ($A_2$) comprises a dimer derived from the polymerizable monomer component in an amount of less than 0.1% by mass.

3. The method according to claim 1, wherein a pressure at the top of the atmospheric distillation column is −1 kPaG to 1 kPaG and a temperature at the top of the atmospheric distillation column is 90 to 100° C.

4. The method according to claim 1, wherein the pressure at the top of the vacuum distillation column is −90 kPaG to −101 kPaG and a temperature at the top of the vacuum distillation column is 40 to 70° C.

5. The method according to claim 1, wherein a column diameter of the vacuum distillation column is smaller than a column diameter of the atmospheric distillation column.

6. The method according to claim 1, wherein an amount of the chain transfer agent contained in the mixture of the low boiling fraction ($A_1$) and the low boiling fraction ($A_2$) is not less than 50% by mass relative to the amount of the chain transfer agent contained in the volatile component separated with the use of the vented extruder.

7. The method according to claim 1, wherein the acrylic acid alkyl ester is methyl acrylate or ethyl acrylate.

8. The method according to claim 1, wherein the chain transfer agent is an alkylmercaptan having 12 or fewer carbon atoms.

9. The method according to claim 1, wherein the chain transfer agent is n-octyl mercaptan.

10. The method according to claim 1, wherein the polymerizable monomer component comprises 80 to 100% by mass of methyl methacrylate and 0 to 20% by mass of the acrylic acid alkyl ester.

* * * * *